United States Patent Office 3,207,214
Patented Sept. 21, 1965

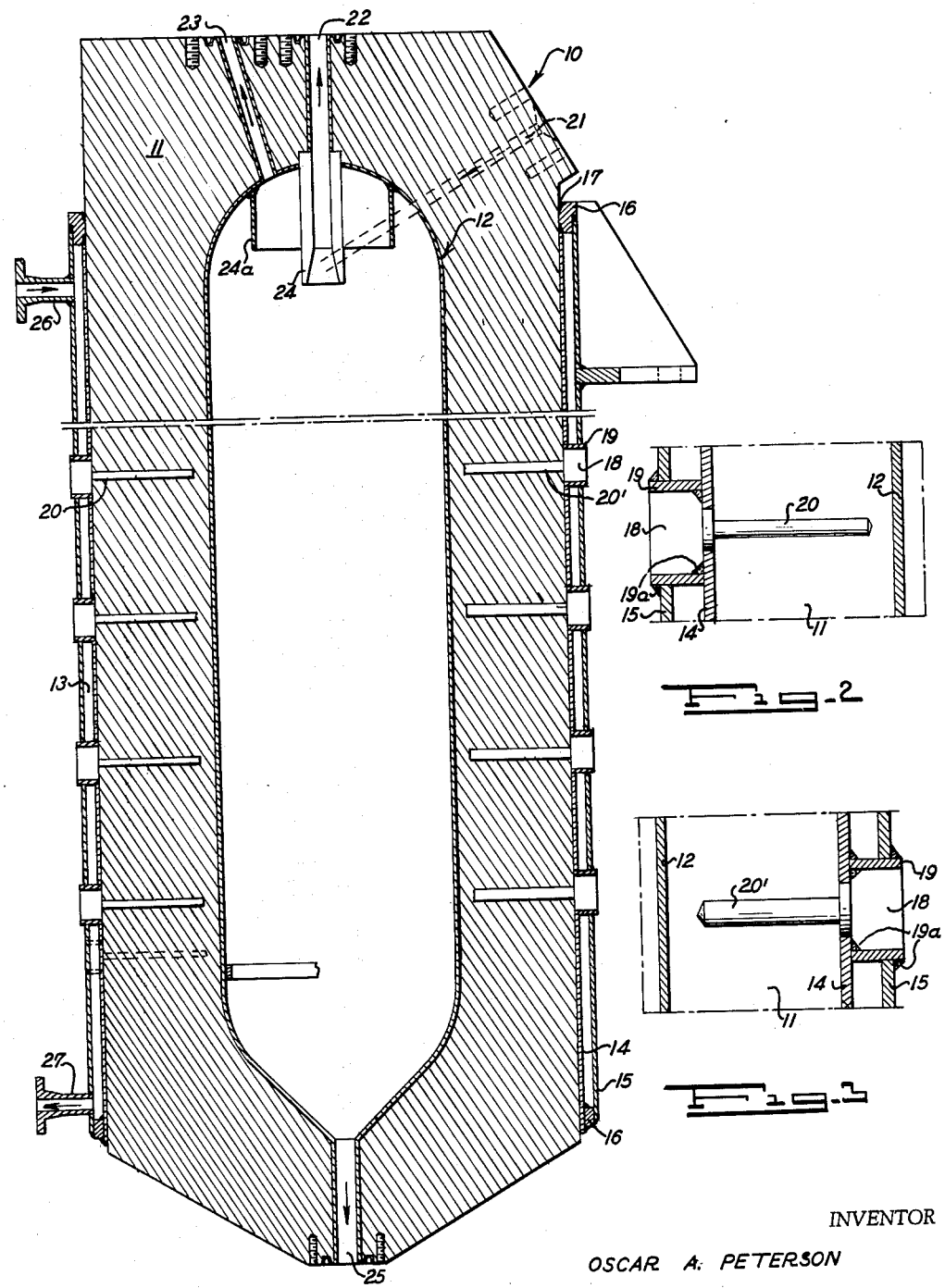

3,207,214
CHEMICAL APPARATUS HAVING HEATING JACKET
Oscar A. Peterson, Washington Township, Westwood, N.J., assignor to Halcon International, Inc., a corporation of Delaware
Filed June 8, 1962, Ser. No. 201,145
3 Claims. (Cl. 165—81)

This invention relates to chemical apparatus for use in separation of mixtures of gases and liquids under elevated pressure and temperature conditions, more particularly to such apparatus including a thick walled separation vessel provided with an annular steam jacket in contact therewith but free to thermally expand or contract relative thereto without buckling, and especially to such a vessel provided with ports drilled part way into the wall of the vessel to permit liquid level determination by radiation type means, the source being set near or in one of said ports and radiation being directed to or through another port set opposite thereto at the same level, the steam jacket being provided with port passages at each of said ports.

High pressure separators are used in many commercial processes and they may be made up in several known ways. The vessel may be in the form of a vertical cylinder having very thick walls. The gas-liquid mixture may be fed near or at the top thereof, and after separation, the gas may be removed via an appropriate valve opening near the top, and the liquid may be removed via an appropriate opening near or at the bottom thereof. One means of determining the liquid level therein is by so-called radiation type liquid level indicators which involve passing radiation from one side of the vessel to the other and detecting the change in radiation passed therethrough, with suitable means such as a Geiger counter when the path changes from gas to liquid. During operation, the vessel may be allowed to accumulate liquid, i.e., the liquid may be drawn-off intermittently or continuously.

The liquid mixture to be separated may require maintenance under high pressure and temperature conditions, such as an ethylene polymerization reaction mixture containing gaseous ethylene as well as liquid polymer which is separated at a pressure of about 4,000 to 15,000 p.s.i.g. and a temperature of about 200° to 575° F. The vessel has to be provided with means for maintaining this temperature; i.e. to prevent radiation heat loss.

The heretofore proposed steam jacketing means has been welded directly to the outer wall of the vessel and required complicated bellows expansion means. In addition, the radiation device ports were covered by welded caps. The art is confronted by the problem of providing efficient jacketing means which eliminates the completed bellows requirements as well as provides ready access to and accurate determination of the location of the radiation device ports.

The discoveries associated with the invention and relating to the solution of the above problems, and the objects achieved in accordance with the invention as set forth herein include the provision of:

An apparatus for separating a mixture of gas and liquid at elevated temperature and pressures, including the combination of a heavy walled vessel provided with feed means and gas-draw-off means near the upper end thereof and liquid draw-off means near the lower end thereof, at least two pairs of ports arranged along the vessel for introducing and detecting radiation for determination of liquid level in the vessel, a heating jacket means continuous with and in contact with the outer wall of the vessel and free to remove relative to said vessel under the influence of temperature differences therebetween, said jacket being provided with passages openings adjacent to each of the ports of the vessel and with heating fluid inlet and outlet means;

Such an apparatus wherein the outer wall of the vessel is cylindrical in shape and the steam jacket is annular in shape, one end of the jacket being attached to the vessel wall;

Such an apparatus wherein the jacket is made up of an inner wall and an outer wall, each end of the jacket being provided with an annular spacer and each of the walls is attached to the spaced at each end;

Such an apparatus wherein each of the jacket passages includes a sleeve passing through an opening in the outer jacket wall and set on the inner wall of the jacket, the opening in the inner jacket wall adjacent the outer surface of the pressure vessel being smaller than the opening in the outer jacket wall, the inner jacket wall opening being large enough to permit access to the contiguous or adjacent port in the vessel, the sleeve being attached to each of the jacket walls at its contact points therewith.

Such an apparatus wherein the vessel is built-up of layers and it is provided with at least one tell-tale hole, the jacket being provided with an opening contiguous to each of said tell-tale holes;

And other objects which will be apparent as details or embodiments of the invention are set forth hereinafter.

In the accompanying drawings, FIGURE 1 is a cross sectional view of a separator provided with a steam jacket in accordance with the invention, and FIGURE 2 is an enlarged view of the radiation device portholes as well as the access openings thereto in the steam jacket of FIGURE 1, as is in FIGURE 3.

In order to indicate still more fully the nature of the present invention, the following examples of typical procedures are set forth in which parts and percents means parts and percents by weights, respectively, unless otherwise indicated, it being understood that these examples are presented as illustrative only and they are not intended to limit the scope of the invention.

*Example 1*

Referring to FIGURE 1, the high pressure separator 10 is provided with a thick steel wall 11 which may be made by forging, laminating, or any convenient manner. The vessel is provided with a liner 12 of corrosion resistant material such as stainless steel. The vessel is provided with a heating fluid jacket 13 having inner wall 14 in contact with the outer part of the well 11, and it is also provided with an outer wall 15. The walls 14 and 15 are spaced and sealed by member or spacer 16 to which each wall is welded. There is one of such spacers near the bottom and also one near the top. The inner jacket wall 14 is in contact with the vessel wall 11 but free to move relative thereto. The upper part of the jacket is attached to the steel wall 11 via weld 17. The jacket is provided with a series of passages 18 arranged to provide access to holes or ports 20 and 20' drilled into the wall 11. The hole 20 and analogous holes are for introducing the radiation from a usual radiative source such as cobalt 60 and the holes 20' and analogous holes are for passing out and detecting the radiation.

The separator is provided with inlet means 21 for introducing the mixture of gas and liquid, gas outlet means 22, relief valve means opening 23, guide means 24 and also guide means 24a, as well as liquid outlet means 25. The jacket is provided with fluid inlet means 26 and fluid or condensate outlet means 27. All of said means are provided with appropriate valves. Steam is a preferred heating fluid, but any other suitable fluid may be used.

If the vessel is built-up from a series of layers, one or more tell-tale holes 20 are provided in usual manner, and a jacket passage 18 is provided for each.

Referring to FIGURE 2, the access passage in the steam jacket 13 includes a tubular member 19 welded by welds 19a to the inner wall 14 and the outer wall 15 of the jacket as does FIGURE 3.

During start-up of a plant including this separator, such as a plant for making polyethylene from ethylene, the separator is brought up to temperature by passing steam through the jacket. This is accomplished efficiently in accordance with the invention without any buckling or the like problems, even through the bellows means of prior suggestions is eliminated. The tube walls of the annular steam jacket expand together and the inner wall is free to move lengthwise relative to the wall of the vessel without restraint.

The present apparatus completely avoids the problem of welding caps or covers for the radioactive radiation means, which may be set near or in ports 20, as was called for in prior suggestions. This facilitates location and use of automatic or semi-automatic means for introducing or retracting the radiation into or from the bottom of the port.

The reaction mixture of ethylene and polyethylene prepared in known manner may be separated in the vessel at a pressure of about 2,500 to 15,000 p.s.i.g. and a temperature of about 200° to 575° F. This reaction mixture may be prepared in accordance with the reaction conditions set forth in U.S. Patent 2,852,501. The liquid polymer is allowed to build-up to a level of one of the port arrangements above the lower port arrangement and then the valve may be opened until the level recedes to that of the lower port arrangement at which time the valve is closed and the procedure is repeated. If the rate of feed to the vessel is appropriately regulated, the liquid draw-off may be continuous, the level of the liquid in the vessel being maintained above that of the lower port arrangement but below one of the other port arrangements. Two or more pairs of port arrangements may be used as desired, three being shown in FIGURE 1 above the lower set.

Although a cylindrical type vessel is preferred since it may be provided with an annular jacket other shapes may be used if desired, providing the inner jacket wall is substantially continuously, in contact with the outer wall of the separator vessel and also provided with the freedom of relative movement due to temperature differences.

In view of the foregoing disclosures, variations and modifications thereof will be apprent to one skilled in the art, and it is intended to include within the invention all such variations and modifications except as do not come within the scope of the appended claims.

What is claimed is:

1. In an apparatus for separating a mixture of gas and liquid at elevated temperature and pressure, the combination of a heavy walled vessel provided with feed means and gas draw-off means near the upper end thereof and liquid draw-off means near the lower end thereof, the vessel wall having an inner and outer surface, at least two pairs of holes extending from the outer surface of the vessel wall partially through the vessel wall and adapted for introducing and detecting radiation for the determination of liquid level in the vessel, and annular heating jacket means substantially continuous with and in contact with the outer surface of the said vessel, said jacket means being attached at one end to the outer surface of the vessel wall and being free to move relative to the vessel under the influence of temperature differences therebetween, said heating jacket being provided with access passages therethrough to each of the holes of the vessel and with heating fluid inlet and outlet means.

2. An apparatus of claim 1 wherein the jacket is made up of an inner wall and an outer wall, each end of the jacket being provided with an annular spacer and each of the walls is attached to the spacer at each end.

3. An apparatus of claim 2 wherein each of the access jacket passages includes a sleeve passing through an opening in the outer jacket wall and set on the inner jacket wall, the inner jacket wall opening being smaller than the outer wall opening, the inner jacket wall opening being large enough to permit access to the adjacent hole in the vessel wall, the sleeve being attached to each of the jacket walls at its contact points therewith.

References Cited by the Examiner

UNITED STATES PATENTS

| | | | |
|---|---|---|---|
| 1,727,179 | 9/29 | Rostek | 165—154 |
| 1,932,247 | 10/33 | Kniskern | 23—289 |
| 1,978,608 | 10/34 | Straty | 220—14 X |
| 2,887,470 | 5/59 | Muench et al. | 23—290 X |
| 3,041,152 | 6/62 | Christensen | 23—290 |

CHARLES SUKALO, *Primary Examiner.*

UNITED STATES PATENT OFFICE
CERTIFICATE OF CORRECTION

Patent No. 3,207,214                         September 21, 196

Oscar A. Peterson

It is hereby certified that error appears in the above numbered patent requiring correction and that the said Letters Patent should read as corrected below.

Column 2, line 47, for "well" read -- wall --; line 58, for "radiative" read -- radioactive --; column 3, line 19, after "radiation" insert -- source --; line 45, for "apprent" read -- apparent --.

Signed and sealed this 19th day of April 1966.

(SEAL)
Attest:

ERNEST W. SWIDER                         EDWARD J. BRENNE
Attesting Officer                            Commissioner of Patents